United States Patent Office 3,187,189
Patented June 1, 1965

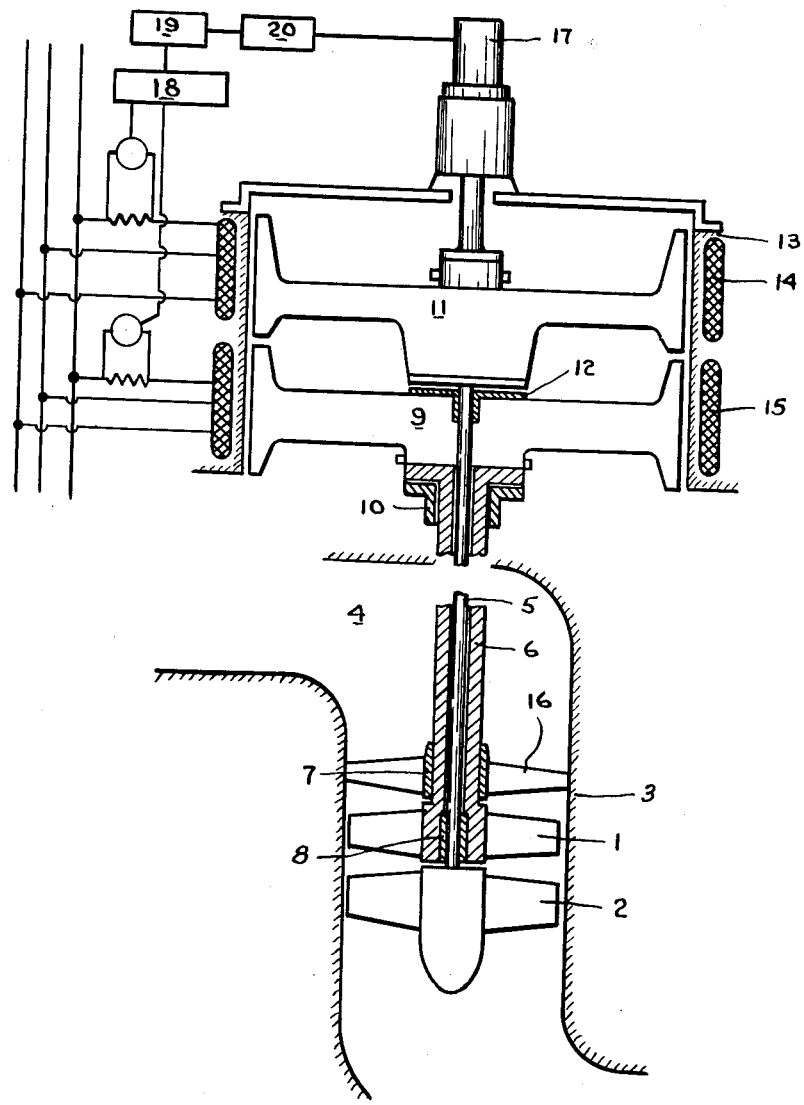

3,187,189
CONTRAROTATING HYDROELECTRIC MACHINES INCLUDING TWO SYNCHRONOUS GENERATORS
Johann H. Lang, Beaconsfield, Quebec, Canada, assignor to Dominion Engineering Works Limited
Filed Nov. 20, 1962, Ser. No. 238,842
5 Claims. (Cl. 290—40)

This invention relates to contrarotating hydroelectric machines and has particular reference to the provision of new and improved means for establishing and maintaining control of the torque ratio of the two contrarotating elements of such a machine at all loads.

In the past, attempts have been made to establish and maintain this control by means of two direct current electric machines. Other attempted solutions to this problem involved the use of a duplex differential planetary gear train located in the water wheel hub.

However, where the two direct current machines were utilized, it was found that such use possessed certain disadvantages. The direct current machines were found to be suitable for use only in certain types of installations. They were found to be subject to economic size limitations. Further difficulties were encountered due to the fact that electric grid systems throughout the world are predominantly alternating current and to solve this problem it was found necessary to install appropriate inverter equipment. Large direct current machines and appropriate inverter equipment are extremely expensive.

Where the duplex differential planetary gear train in the hub was used, other difficulties were encountered. The size of the differential planetary gears was found to be limited by the size of the hub. Furthermore, gearing so located is inaccessible and vulnerable to leaking seals. The location of the gearing externally of the water wheel hub is expensive and involves a considerably complicated design.

An object of this invention is to provide a new and improved contrarotating hydroelectric machine possessing a high degree of efficiency over a wide spectrum of operating regimes.

Another object of the invention is to provide a new and improved contrarotating hydroelectric machine for use in conjunction with an alternating current electric power system, which machine is provided with new and improved means for controlling the torque ratio of the two contrarotating elements.

Another object of the invention is to provide a new and improved contrarotating hydroelectric machine having new and improved means for controlling the torque ratio of the two contrarotating elements wherein the torque controlling means are monitored by signals from sensors responsive to variation of torsional stress in the driving shafts or to variations of electric power or to swirl in the water wheel outflow.

Other objects and advantages of the invention will be apparent from the foregoing description taken in connection with the accompanying drawing. It will be understood that changes may be made in the details of construction and that the arrangement of parts shown and described is the preferred form of the invention given by way of illustration only.

The single drawing figure is a diagram illustrating a hydroelectric machine and a system for controlling the torque ratio of its contrarotating water wheels.

In the following description and in the claims, the terms "fixed-pitch" and "variable-pitch" are used with reference to water wheels. Where the water wheels are of the axial flow type, these terms are self explanatory; but it is to be understood that the full meaning of the word "pitch" in the context of this disclosure is "specific speed at maximum efficiency." In the interests of brevity and clarity, the single word "pitch" will be employed hereinafter with reference to all types of water wheels, whether turbine runner or pump impeller and whether axial, radial, or tangential flow, or any combination of these.

In the case of a single wheel hydraulic machine, rotation is imparted to the water passing through the wheel.

In such single wheel machines, it may happen that at one point in the load range the rotation imparted to the water by the wheel cancels rotation imparted to the water before reaching or after leaving the wheel. From the viewpoint of efficiency, this is desirable; however, the ideal would be the elimination of swirl from the outflow of the machine throughout the load range.

In a contrarotating hydraulic machine, the rotation imparted to the water passing through one of the two wheels may be modified or cancelled by the rotation imparted by the other wheel.

From the viewpoint of efficiency, the ideal might be for water to approach the upstream wheel without swirl and to leave the downstream wheel without swirl. In this case the requirement would be for the torque ratio of the two wheels to be unity. There may be, however, good reasons why, even though it involves a compromise in respect of efficiency, the torque ratio of the two wheels should be other than unity, and further reasons why the actual value of the torque ratio should vary with the load factor. Such reasons may have their origin in the design of the upstream and/or the downstream water passages, variations of hydraulic head, and avoidance of cavitation.

A realistic compromise with the ideal is to establish control over the ratio of torques in the wheels of a contrarotating machine so that the machine may be operated at all points in the load range as near to the ideal condition as practicable.

In large hydroelectric machinery, the electric power is usually in the form of alternating current at the frequency of a large grid system of which the hydroelectric machine in question is a relatively small component. It is necessary, therefore, if the machine is to be associated with such an alternating current grid system, that it must either use or deliver electric power at the frequency of the grid. That is to say that, when the two electric wheels are of the synchronous type and synchronized with the grid, the two water wheels must maintain constant speed. Since the two water wheels are always subject to identical mass flow of water, the torque ratio of the two wheels can be controlled by varying the characteristic of at least one of the two wheels, as by changing the blade pitch.

Referring to the drawing, the device shown embodying the invention comprises a water passage 4, a portion of which water passage 4 is formed by the throat ring 3, a fixed-pitch axial flow type water wheel 1 is mounted upon a hollow shaft 6 and rotates within throat ring 3, concentric with said hollow shaft 6 is an inner shaft 5; a variable-pitch axial flow type water wheel 2 is mounted upon inner shaft 5 and rotates within throat ring 3, water wheels 1 and 2 being contrarotating. Water wheel 2 is provided with suitable means for effecting change of pitch.

Hollow shaft 6 runs in guide bearing 7 which is located by means of the spider 16 adjacent water wheel 1. Guide bearing 8 is located between hollow shaft 6 and inner shaft 5 in the plane of water wheel 1. The end of hollow shaft 6 remote from water wheel 1 is connected to lower rotor 9. Directly below rotor 9 is positioned the main thrust and guide bearing 10. Inner shaft 5 is connected at its end remote from water wheel 2 to upper rotor 11. Upper thrust and guide bearing 12 is positioned between lower rotor 9 and upper rotor 11.

Lower rotor 9 and upper rotor 11 rotate within the common armature housing 13, which is provided with separate windings 14 and 15 corresponding to rotors 11 and 9 respectively.

A suitable mechanism 17 for registering and controlling pitch changes of the water wheel 2 is located above armature housing 13.

The currents in coils 14 and 15 are functions of the torque in water wheels 2 and 1 respectively. These currents are measured in conventional comparator circuit 18. Amplifier 19 amplifies signals from comparator 18 for conventional electrohydraulic governor 20 which responds to the amplified signals from comparator circuit 18 instead of responding to signals from a speed sensing device. Electric signals from comparator circuit 18 are translated into pitch changes of water wheel 2, resulting in torque changes in water wheel 2 which, in turn, changes the current in armature winding 14 until it is in the desired ratio to the current in armature coil 15, whereupon pitch change ceases, as the required torque ratio has been established.

It is understood that water wheel 1, instead of being fixed-pitch as illustrated, could be endowed with variable pitch without departing from the spirit of this invention.

Furthermore, the torques in water wheels 1 and 2 could be measured by evaluation of the torsional stresses in the shafts 6 and 5 respectively. These torsional stresses, as measured by strain gauges for example, could be employed as signals in the comparator 18 instead of employing the currents in windings 15 and 14.

Swirl in the outflow of water passage 4 might be measured by means of a simple vane whose angular movements could be employed to generate signals which, amplified in the amplifier 19, could be employed to adjust the torque ratio of water wheels 1 and 2 until the desired swirl is achieved.

The operation of the invention is believed apparent from the foregoing description.

Thus, it will be seen that I have provided new and improved means for obtaining all of the objects and advantages of the invention.

I claim:

1. In combination, two synchronous contrarotating hydroelectric machines having the water wheels thereof operating in a common water stream, and means for apportioning the torque developed by the two machines for nearly optimum hydraulic efficiency of the combination throughout the normal operating range of the machines, one of said hydroelectric machines having a fixed pitch water wheel and the other hydroelectric machine having a variable pitch water wheel, said torque apportioning means comprising means for obtaining from each hydroelectric machine a signal representing the torque developed by the machine, means for comparing said signals to obtain a control signal representing the difference of said torques, and means for applying said control signal to control the pitch of said variable pitch water wheel so as to maintain said optimum hydraulic efficiency.

2. In combination, two synchronous contrarotating hydroelectric machines having the water wheels thereof operating in a common water stream, and means for controlling the torque ratio of said hydroelectric machines, one of said hydroelectric machines having a fixed pitch water wheel and the other hydroelectric machine having a variable pitch water wheel, said torque control means comprising means for obtaining from each hydroelectric machine a signal representing the torque developed by the machine, means for comparing said signals to obtain a control signal representing the difference of said torques, and means for applying said control signal to control the pitch of said variable pitch water wheel so as to maintain said torque ratio within preset limits.

3. In combination, two synchronous contrarotating hydroelectric machines having the water wheels thereof operating in a common water stream, and means for controlling the torque ratio of said hydroelectric machines, each one of said hydroelectric machines having a variable pitch water wheel, said torque control means comprising means for obtaining from each hydroelectric machine a signal representing the torque developed by the machine, means for comparing said signals to obtain a control signal representing the difference of said torques, and means for applying said control signal to control the pitch of at least one of said water wheels so as to maintain said torque ratio within preset limits.

4. In combination, a hydroelectric machine having contrarotating, axial flow, coaxial water wheels operating in closely spaced axial relation in a common water stream and a shaft for each water wheel for driving the machine, and means for controlling the torque ratio of said shafts, at least one of said water wheels having variable pitch blades, said torque control means comprising means for obtaining for each shaft a signal representing the torque developed therein, means for comparing said signals to obtain a control signal representing the difference of said torques, and means for applying said control signal to control the pitch of said blades so as to maintain said torque ratio within preset limits.

5. Hydroelectric apparatus comprising two axial flow water wheels adapted to rotate in opposite directions in a common water stream, said wheels being coaxial and closely spaced axially; two synchronous electric machines; a shaft connecting one machine to one water wheel and another shaft connecting the other machine to the other water wheel, at least one of said water wheels having variable pitch blades; means for obtaining a signal from each machine representing the electric loading thereon; means for comparing said signals to obtain a control signal representing the difference of said loadings; and a device for varying the pitch of said blades in response to said control signal so as to maintain the torque developed by said wheels within a preset ratio.

References Cited by the Examiner

UNITED STATES PATENTS

| | | | |
|---|---|---|---|
| 760,035 | 5/04 | Stumpf | 253—16.5 |
| 2,269,309 | 1/42 | Herring | 170—135.28 |
| 2,782,321 | 2/57 | Fischer | 290—52 |
| 2,783,391 | 2/57 | Crever | 290—4.1 |
| 2,790,090 | 4/57 | Hide et al. | 290—4.1 |
| 2,872,591 | 2/59 | Stineman | 290—4.1 |
| 3,067,334 | 12/62 | Byloff et al. | 290—4 |

ORIS L. RADER, *Primary Examiner.*